United States Patent
Harrison

(10) Patent No.: US 10,242,198 B2
(45) Date of Patent: Mar. 26, 2019

(54) SECURE BOOTING OF A COMPUTING SYSTEM BASED ON WRITE REQUEST AND POWER-UP MANAGEMENT

(71) Applicant: GARRISON TECHNOLOGY LTD, Greater London (GB)

(72) Inventor: Henry Harrison, Greater London (GB)

(73) Assignee: Garrison Technology LTD, London (GB)

( * ) Notice: Subject to any disclaimer, the term of this patent is extended or adjusted under 35 U.S.C. 154(b) by 0 days.

(21) Appl. No.: 15/502,315

(22) PCT Filed: Dec. 2, 2016

(86) PCT No.: PCT/EP2016/079667
§ 371 (c)(1),
(2) Date: Feb. 7, 2017

(87) PCT Pub. No.: WO2017/093533
PCT Pub. Date: Jun. 8, 2017

(65) Prior Publication Data
US 2018/0314828 A1    Nov. 1, 2018

(30) Foreign Application Priority Data

Dec. 3, 2015 (GB) .................................. 1521394.5

(51) Int. Cl.
*G06F 9/00* (2006.01)
*G06F 15/177* (2006.01)
(Continued)

(52) U.S. Cl.
CPC .......... *G06F 21/575* (2013.01); *G06F 9/4416* (2013.01)

(58) Field of Classification Search
None
See application file for complete search history.

(56) References Cited

U.S. PATENT DOCUMENTS 6,539,480 B1    3/2003    Drews
6,546,489 B1    4/2003    Frank, Jr. et al.
(Continued)

FOREIGN PATENT DOCUMENTS

| | | |
|---|---|---|
| CN | 103955648 | 7/2014 |
| CN | 104363231 | 2/2015 |
| EP | 2339494 | 6/2011 |

OTHER PUBLICATIONS

Wikipedia Article for "Intel Active Management Technology" (https://en.wikipedia.org/wiki/Intel_Active_Management_Technology), Jan. 23, 2017, pp. 1-11.

*Primary Examiner* — Nitin C Patel
(74) *Attorney, Agent, or Firm* — Occhiuti & Rohlicek LLP

(57) ABSTRACT

A secure boot computer system is provided. The system comprises a logic block comprising one or more processing units that executes instructions, the logic block being configured to request boot instructions over a first interface, according to a first communication protocol, on power-up or reset of the logic block. A controller component is configured to communicate with the logic block over the first interface according to the first communication protocol, the controller being further configured to implement a communications link to a second computer system and to receive the boot instructions from the second computer system. The logic block is preconfigured to communicate with the controller over the first interface according to the first communication protocol in a manner that cannot be altered by instructions executed by the logic block. The controller is configured to prevent the completion of any write requests from the logic block. The system further comprising a control connection between the logic block and the controller. The controller is further configured to use the control connection to power-up or reset the logic block to place the (Continued)

logic block in a predetermined active state resulting from executing the boot instructions, such that software operating on the logic block prior to power-up or reset of the logic block cannot affect the predetermined active state. A corresponding method and second computer system are also provided.

33 Claims, 7 Drawing Sheets

(51) Int. Cl.
*G06F 21/57* (2013.01)
*G06F 9/4401* (2018.01)

(56) References Cited

U.S. PATENT DOCUMENTS

| | | | |
|---|---|---|---|
| 7,007,077 B1 | 2/2006 | Shinohara et al. | |
| 7,293,165 B1 | 11/2007 | Tobias | |
| 8,104,083 B1 | 1/2012 | Sobel et al. | |
| 8,528,062 B1 | 9/2013 | Connor | |
| 8,839,417 B1 | 9/2014 | Jordan | |
| 2004/0076043 A1 | 4/2004 | Boals et al. | |
| 2005/0172280 A1 | 8/2005 | Ziegler et al. | |
| 2005/0289533 A1 | 12/2005 | Wang et al. | |
| 2007/0192854 A1 | 8/2007 | Kelley et al. | |
| 2007/0226478 A1 | 9/2007 | Rudelic | |
| 2008/0301799 A1 | 12/2008 | Arnold et al. | |
| 2009/0213939 A1 | 8/2009 | Jung et al. | |
| 2009/0213940 A1 | 8/2009 | Steinbach et al. | |
| 2009/0252227 A1 | 10/2009 | NepomucenoLeung et al. | |
| 2010/0043047 A1 | 2/2010 | Archer et al. | |
| 2011/0035808 A1 | 2/2011 | Butler et al. | |
| 2011/0085602 A1 | 4/2011 | He | |
| 2011/0162077 A1 | 6/2011 | Kadam | |
| 2012/0226895 A1 | 9/2012 | Anderson et al. | |
| 2013/0054948 A1 | 2/2013 | Raj et al. | |
| 2013/0058394 A1 | 3/2013 | Nilsson et al. | |
| 2014/0089650 A1 | 3/2014 | Polzin et al. | |
| 2015/0264056 A1 | 9/2015 | Mevec et al. | |
| 2015/0264359 A1 | 9/2015 | Vanam et al. | |

SECURE BOOTING OF A COMPUTING SYSTEM BASED ON WRITE REQUEST AND POWER-UP MANAGEMENT

CROSS REFERENCE TO RELATED APPLICATION

This application is the national phase under 35 USC 371 of international application NO. PCT/EP2016/079667, filed Dec 2, 2016, which claims the benefit of the priority date of Great Britain Application No. 1521394.5, filed Dec 3, 2015, The contents of the aforementioned applications are incorporated herein in their entirety.

TECHNICAL FIELD

The invention relates to boot-up of computer systems, and particularly to a computer system and method for securely booting.

BACKGROUND

Malicious software is a continuing problem for all computer systems. Of particular concern is the ability of malicious software to persist after the computer system is rebooted, by making changes to persistent storage, such as hard disks or flash memory, such that when the computer system is rebooted, these changes ensure the reloading of the malicious software.

Although a computer which boots from Read Only Memory (ROM) can solve this problem, it introduces other problems because the boot software (bootloader and/or operating system) cannot be patched or upgraded to address shortcomings such as bugs or security vulnerabilities. In practice, therefore, computers do not boot from true ROM, although they may in some cases boot from a "programmable ROM" (PROM) or "field programmable ROM" (FPROM). Programmable ROMs differ from standard ROM because data in a PROM is programmed after manufacture. In practice, PROMs are a form of persistent storage.

One attempt to solve the problem of persistent malicious software is described in US patent application US 2011/0035808. The method describes the use of a custom storage controller which prevents a computer system from making changes to a boot image in order to avoid the possibility of malware persistence following a reboot. US 2011/035808 then describes a mechanism whereby that computer system can make changes to the boot image under certain circumstances subject to the insertion of a physical cryptographic token. Embodiments of the invention described herein do not permit this, but provide instead a mechanism whereby changes to the boot image can be made by a second computer system which connects to the storage controller independently of the first computer system.

Another attempt to solve the problem is described in U.S. Pat. No. 6,546,489. This describes booting a host computer using a disk drive coupled to the host computer. The disk drive asserts a signal to place the processor of the host computer in an inactive state where the host processor cannot access its memory. The disk drive then writes a template for booting the host computer to the host processor's memory from a protected area of the disk drive. The disk drive then de-asserts the signal, allowing the host processor to boot from the host memory array. According to this method, any legitimate changes to the boot image stored in the protected area of the disk must be made by software running on the host computer. There must therefore exist a state of the host computer in which changes to the boot image can made, and a malicious user could in principle use malicious software to generate the state and change the boot image. Embodiments of the invention do not permit this, but provide instead a mechanism whereby changes to the boot image can be made by a second computer system which connects to the storage controller independently of the first computer system.

U.S. Pat. No. 7,293,165 describes systems in which a server with a CPU also includes an autonomously operating baseboard management controller (BMC) which communicates with the CPU over an LPC bus. The BMC includes storage which stores the system BIOS, and a bus interface which decodes and responds to bus access requests, including requests with a memory address range associated with boot operations. When the CPU makes a request with an address range associated with boot operations, the bus interface forwards the request to a memory interface which reads the system BIOS from the storage and returns the system BIOS over the bus. The storage is implemented as SRAM, and the system BIOS can be patched and updated by a remote computer over a network interface. However, there is no consideration of how to ensure that the CPU can revert to a known good state.

SUMMARY OF THE INVENTION

The invention is defined in the independent claims to which reference is now directed. Preferred features are set out in the dependent claims.

According to a first aspect of the invention there is provided a secure boot computer system comprising a logic block and a controller. The logic block comprises one or more processing units for executing instructions and is configured to request boot instructions over a first interface, according to a first communication protocol, on power-up or reset of the computer system. The controller, which may be implemented as a storage controller, is configured to communicate with the logic block over the first interface according to the first communication protocol, and is further configured to implement a communications link to a second computer system and to receive the boot instructions from the second computer system. The logic block is preconfigured to communicate over the first interface according to the first communication protocol in a manner that cannot be altered by instructions executed by the logic block. The controller is configured to prevent or refuse any write requests from the logic block. The system further comprises a control connection between the logic block and the controller. The controller is further configured to use the control connection to power-up or reset the logic block to place the logic block in a predetermined active state resulting from executing the boot instructions, such that software operating on the logic block prior to power-up or reset of the logic block cannot affect the predetermined active state.

Pre-configuring the logic block such that it is fixed, on power-up or reset, to communicate with the storage controller over the first interface according to the first protocol, and also preventing the secure boot computer system from completing write requests from the logic block, provides a computer system that can be protected against the persistence of malware that might seek to corrupt the boot instructions. or boot image, while allowing changes to the boot instructions to be made using a separate computer system, and that prevents malicious software running on the secure boot computer system from making changes to operating system files which would allow it to persist after a reboot. This provides a secure system that also allows the boot image to be updated. By combining this functionality with the control functionality, the storage controller is able to place the logic block in a desired predetermined active end state in such a way that no software operating on the logic block prior to commencement of the process can affect the end state. The storage controller is therefore able to place the logic block in an active state, executing, or ready to execute, further instructions following boot, in which it can be certain that the logic block is not running malicious software. By switching off and then switching on again, or resetting, and arranging the boot mechanism as described, it is possible to force logic blocks into a known good state while retaining the ability to update the boot image/instructions, all at a minimal risk of compromise.

The storage controller optionally includes an interface manager and a storage manager, the interface manager being configured to communicate with the logic block over the first interface according to the first communication protocol and to communicate with the storage manager over a second interface. The interface manager may be further configured to identify requests for data over the first interface and communicate the requests to the storage controller over the second interface.

The second interface may be a unidirectional interface, such that it is not possible for data to flow from the logic block to the storage manager except for the purpose of specifying data that should be read from the storage manager via the interface manager. By making the second interface read-only at all times, the boot image cannot be changed over the second interface.

The logic block and storage controller may be implemented within the same physical casing, and may be located on a common circuit board, or on the same integrated circuit. What is important is that there should be no way to alter the initial communication between the logic block and the storage controller to receive the initial boot instructions. This can be achieved by logically hardwiring the logic block to communicate over the first interface according to the first communication protocol. The term "logically hardwired" is used herein to specify any configuration that is not alterable by software or without accessing the internals of the device. This may include physically hardwiring the functionality into the logic block using one or more application specific integrated circuits and/or one or more programmable logic devices, or using instructions stored on a read only memory.

The storage controller may, at a point prior to boot, where the logic block executes instructions to boot the computer system, be configured to refuse any write requests from the logic block. The storage controller may be programmed to execute this functionality, for example using formally verifiable or high assurance instructions. Alternatively the storage controller could, optionally, also be implemented in a hardwired manner. As will be seen, in practice the precise implementation is not essential provided writes from the logic block can be refused.

Data passing over the communications link may be inaccessible by any other component of the secure boot computer system. The controller may include a physical communications port which is connectable via a cable to the second computer system. Alternatively, the controller may implement an encrypted link to the second computer system such that other components of the secure boot computer system may access the encrypted traffic but have no access to the key required to decrypt or encrypt.

The controller may include a persistent store for storing the boot instructions, whereby the boot instructions may be received from the second computer system and stored prior to power-up/reset or boot of the secure boot computer system.

The controller may be configured, in response to a request for the boot instructions from the logic block, to request the boot instructions from the second computer system at the time of receiving the request from the logic block.

The protocol over the first interface may be a preconfigured simple interface protocol, such as may be used to communicate with a flash memory device or a hard disk, for example.

The boot instructions may comprise a reset vector. The controller may then also provide the instructions located at the address identified by the reset vector.

The controller may be further configured to use the control connection to power-down the logic block and to then power-up the logic block, in order to place the logic block in a predetermined active state resulting from executing the boot instructions.

Resetting the logic block may comprise one or more of powering-down the logic block and then powering-up the logic block, and performing a hardware reset of the logic block. A hardware reset is a hardware-level method of forcing a logic block to execute its initial boot process without going through a power-down/power-up sequence.

The controller may be further configured to use the control connection to control the power state of RAM connected to the logic block. If the logic block is powered down or reset having been running malicious software, but the RAM is not powered down or reset, there is a risk that some data may be left in the RAM and that this will affect the end state of the logic block following power up or reset of the logic block (101). Such data could cause a recurring compromise post reboot. Powering down the RAM helps ensure that there can be no residual effect from software running on the device prior to reboot.

The control connection may connect to one or more voltage input pins of the logic block. The controller may then power-up, power-down or reset the logic block by controlling whether voltage is applied to one or more of the voltage pins.

The control connection may connect to a reset pin of the logic block. The controller may then reset the logic block by controlling whether voltage is applied to the reset pin.

The secure boot system may further comprise a power management integrated circuit (a PMIC). The control connection may then be between the PMIC and the logic block.

The controller may be configured, in response to a communication from the logic block over the first interface which indicates that the logic block has finished processing data, to use the control connection to power-down or reset the logic block.

The controller may be configured, in response to a communication from the logic block over the first interface which indicates that malicious software has taken control of the logic block, to use the control connection to power-down or reset the logic block. The controller may be configured to analyse the communication sent by the logic block over the first interface to determine whether malicious software has taken control of the logic block.

Communications from the logic block over the first interface may be one or more read or write requests. The controller may be configured to power-down or reset the logic block in response to any write request from the logic block.

The controller may be configured, in response to a communication over the communications link, to use the control connection to power-up, power-down or reset the logic block. Communications over the communications link may be from the second computer system, or may be from a computer system other than the second computer system. The communication over the communications link may be a request to power-up, power-down or reset the logic block.

The controller may be configured, in response to input from a sensor and/or a user, to power-up, power-down or reset the logic block.

Any power-down command may be followed by a power up command to place the logic block back into the predetermined active state.

The secure boot system may be further configured to allow the logic block to communicate with a user network over a network interface. The logic block may be configured to communicate with the network interface via the controller over the first interface, or over an interface that is distinct from the first interface. The controller may be configured, in response to a request from the logic block to read or write network data over the first interface, to forward the request to the network interface.

The secure boot system may comprise one or more additional logic blocks comprising one or more processing units. Each of the one or more additional logic blocks will be configured to request boot instructions over a respective first interface according to the first communication protocol, on power-up or reset of the respective logic block. The controller will be further configured to communicate with the one or more additional logic blocks over the respective first interface according to the first communication protocol. Each of the one or more additional logic blocks will be preconfigured to communicate with the controller over the respective first interfaces according to the first communications protocol in a manner that cannot be altered by instructions executed by the logic block. The controller will be configured to prevent the completion of any write requests from the one or more additional logic blocks. The secure boot system will further comprise respective control connections between the controller and each of the one or more additional logic blocks, whereby the controller is configured to use the control connection to power-up or reset the logic blocks to place the logic blocks in a predetermined active state resulting from executing the boot instructions, such that software operating on the logic blocks prior to power-up or reset of the logic blocks cannot affect the predetermined active state.

In systems which comprise one or more additional logic blocks, the controller may comprise a respective interface manager for each logic block and a common storage manager. Each respective interface manager will be configured to communicate with its respective logic block over the respective first interface according to the first protocol.

The first communication protocol may be one of the SD Card protocol, the SDIO protocol, and the eMMC protocol.

The boot instructions may comprise a complete Operating System.

A corresponding method of securely booting a computer system may be provided. The computer system comprises a logic block and a controller, the logic block being preconfigured to communicate with the controller over a first interface according to a first communication protocol in a manner that cannot be altered by instructions executed by the logic block, and the controller being configured to prevent the completion of any write requests from the logic block. The system further comprises a control connection between the logic block and the controller. The controller is configured to use the control connection to power-up or reset the logic block to place the logic block in a predetermined active state resulting from executing the boot instructions, such that software operating on the logic block prior to power-up or reset of the logic block cannot affect the predetermined active state. The method comprises: sending a command from the controller to the logic block over the control connection instructing power-up or reset of the logic block; on power-up or reset of the logic block, requesting via the logic block boot instructions over the first interface, according to the first communication protocol; implementing, at the controller, a communications link to a second computer system and receiving the boot instructions from the second computer system; providing the boot instructions from the controller to the logic block; and subsequently preventing, at the controller, the completion of any write requests from the logic block.

According to a second aspect of the invention there is provided a management computer system configured for use with the secure boot computing system described herein. The management computer system is configured to implement a communications link with the controller of the secure boot computing system and send the boot instructions to the controller.

Embodiments of the invention will be particularly relevant to scenarios in which a computer system is managed by persons other than the user of that computer system. This could be in a cloud computing scenario where a company, the cloud service provider, manages the computer system which is then used by a third party, or in a corporate environment where an IT department manages the computer system that is used by an employee.

In such scenarios, the management personnel can use special management computer systems to make changes to the boot images of managed computer systems, while any malicious software introduced onto one of those managed computer systems cannot persist after reboot of the managed computer system.

BRIEF DESCRIPTION OF THE DRAWINGS

The invention will now be further described by way of example only and with reference to the accompanying figures in which.

DETAILED DESCRIPTION

Figure 1:
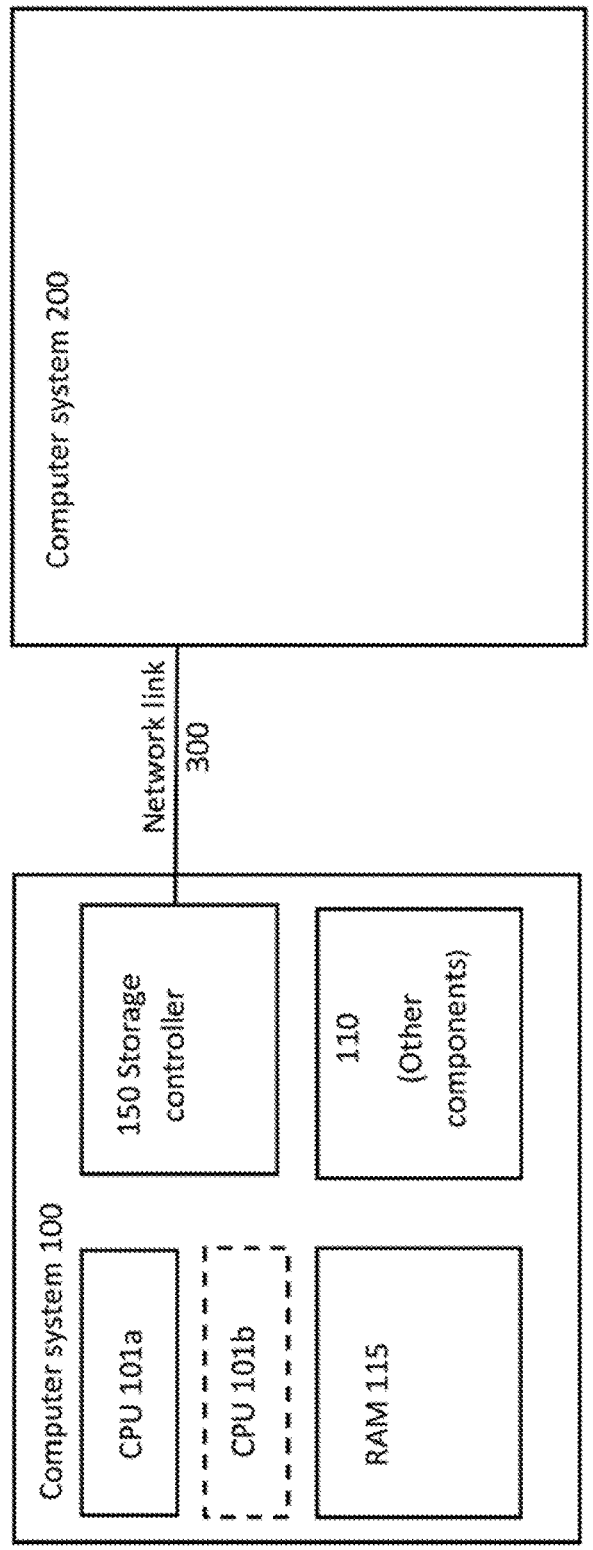
FIG. 1 is a schematic diagram of a first and second computer system according to an embodiment of the invention.

FIG. 1 shows a first computer system (100) that is managed by a second computer system (200). For reference purposes the first computer system will be referred to as a secure boot computer system, and the second computer system will be referred to as a management computer system.

The secure boot computer system (100) will typically comprise one or more CPUs (101a, 101b, etc), some RAM (115) and a specialised storage controller (150). The secure boot computer system (100) may also contain other components (110), potentially including persistent storage, but is configured to seek its boot image from the storage controller (150). This configuration between the CPU, or CPUs, and the storage controller should not be changeable by any means except for physical dismantling of the computer system (100).

The storage controller (150) implements a communications link (300) to the management computer system (200). The communications link may be implemented as a physical wired connection between the secure boot computer system and the management computer system, or as a wired and/or wireless network connection. The communications link may be implemented in such a way that communications over this link (300) cannot be accessed by any other components of secure boot computer system (100). For example, in one implementation, the storage controller (150) contains a physical communications port which is connected via a cable to the management computer system (200). In another implementation, the storage controller (150) implements an encrypted link to the management computer system (200) in such a way that other components of the secure boot computer system (100) might be able to access the encrypted traffic but will have no access to the key required to decrypt or encrypt.

Immediately after power-up or reset, when the secure boot computer system (100) is booted and requests that the storage controller (150) supplies a boot image, the bytes that are provided by storage controller (150) are determined by computer system (200).

The management computer system may provide the boot image to the storage controller at the time of booting, or it may have provided it at a time prior to booting. For example, In one implementation, the storage controller (150) contains local storage such as a disk or memory (e.g. flash memory), and prior to boot the management computer system (200) has previously instructed the storage controller (150) which data from this local storage are to be supplied, potentially supplying these data to the storage controller (150) if it does not yet have them present on the local storage media. For the avoidance of doubt, it is possible that the storage controller (150) is provided with boot data pre-installed which can then be updated by the management computer (200) as necessary. In another implementation, when the secure boot computer system (100) requests a boot image, the storage controller (150) contacts the management computer system (200) to determine what data should be supplied in response to the request, these data being supplied to the storage controller (150) over the communications link (300) at that time.

The behaviour of the storage controller (150) in response to other read requests from the secure boot computer system (100) can also be determined by the management computer system (200). Indeed, a typical boot sequence consists of a series of reads in which the first read is from a defined storage location and subsequent read locations are determined from the results of previous reads. The management computer system (200) would typically instruct the storage controller (150) how to respond to this series of reads at a minimum.

Using this functionality, the management computer system (200) can upgrade, patch or completely replace the operating system to be booted by secure boot computer system (100).

The behaviour of the storage controller (150) in response to write requests from the secure boot computer system (100) should also be considered. By preventing the secure boot computer system (100) from completing write requests, the storage controller (150) prevents malicious software running on the secure boot computer system (100) from making changes to operating system files which would allow it to persist after a reboot.

For the most effective security, the storage controller (150) should be implemented in such a way as to minimise the possibility that malicious software operating on the secure boot computer system (100) can use the interface between the storage controller (150) and the rest of the components of the secure boot computer system (100) as a means of compromising the storage controller (150) and altering its behaviour from that described above. In practical implementations, this interface may use a simple protocol consisting of read and write requests, and associated responses.

Use of a simple protocol is primarily due to the need for the logic block to be hardwired. It is possible for more complex protocols to be used, but this would be practically expensive, and risky, to implement in a hardwired manner. Such an interface is also amenable to being implemented, at the storage controller, using approaches that are particularly difficult to compromise. This may include implementation using one or more application specific integrated circuits (ASICs), or one or more programmable logic devices (PLDs) such as, for example, field programmable gate arrays (FPGAs). Alternatively it is possible to use software developed using formal methods such as formally verifiable or high assurance instructions. Most existing storage controllers today implement this type of interface using ASIC technology.

Figure 2:
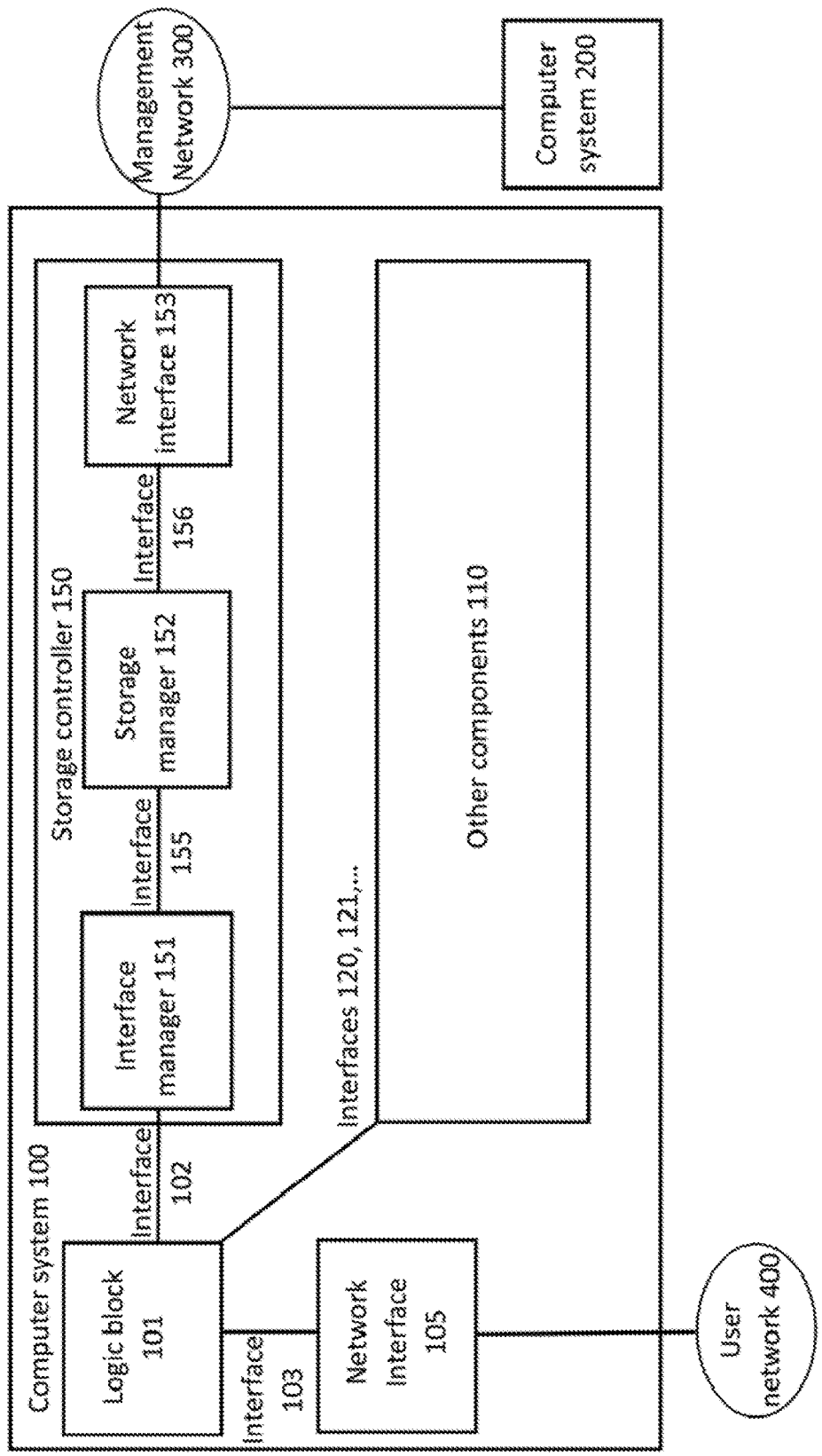
FIG. 2 is a further schematic diagram of a first and second computer system providing additional detail to that of FIG. 1.

FIG. 2 shows certain components and connected entities of the first computer system in greater detail. As with FIG. 1, at the top level, the system is comprised of two computer systems. The first computer system (100), a secure boot system, is connected to a user network (400) such as the Internet, or an enterprise network. The second computer system (200), a management computer system, is connected to a management network (300). The management network (300) is a discrete network environment dedicated to the management of secure boot computer systems such as the secure boot computer system (100).

The secure boot computer system (100) includes, as before, the storage controller (150) which is now shown in greater detail. The storage controller (150) is connected to the management network (300), and in this way it can communicate with the management computer system (200).

As can be seen, the secure boot computer system (100) is made up of a number of logical components. These components might be discrete integrated circuits (ICs) connected on a printed circuit board (PCB), or might be different blocks of logic connected within a single IC.

The logic block (101) is the core of the computer system and contains one or more processing units capable of executing software instructions, such as processors 101a and 101b of FIG. 1. The logic block executes the initial externally fetched instructions necessary to boot the system on power-up or reset. By externally fetched it is meant that the instructions are fetched from a component (other than to a true ROM if necessary to implement the first communication protocol) beyond the logical and/or physical boundary of the logic block. For a single CPU, this may be the first set of instructions received for processing over the CPU bus.

The logic block (101) is connected to the storage controller (150) over interface 102. In this way, following power-up or reset, logic block 101 will seek its initial instructions from the storage controller (150). The design of the logic block (101) is such that this behaviour is "hard wired", "wired up" or "manufactured". In other words, there is no way for software instructions executing on the logic block (101) to change this behaviour.

In most cases, this is achieved by wiring the pins of the bootable IC(s) of logic block 101 in a particular way, for example on a printed circuit board. The boot interface and protocol may be specified by the application of particular voltages or currents to particular pins. Alternatively, by wiring only specific pins to a system that responds to a particular protocol, and not wiring other pins, it is possible to wire the pins so that only one interface and protocol can be booted from. Another approach makes use of an attached ROM, with the IC(s) seeking configuration details stored on the attached ROM. The ROM can be a true (non-rewritable) ROM. Alternatively, an EPROM could be used. An EPROM can be programmed once from software, but subsequently needs to be erased (by exposure to UV light, which requires access to the internals of the device, for example) before it can reprogrammed. As another alternative, a modified EEPROM can be used. An EEPROM would not normally achieve the objective because an EEPROM attached to the IC(s) could be reprogrammed from software instructions executing on the logic block to change the boot interface and/or protocol. However, some EEPROMs can be set to "read-only" mode by wiring particular pins. For example, it may be possible to wire the IC(s) and EEPROM combination so that when power is applied to the IC, the EEPROM is set to the read-only mode, and this achieves the objective because the IC must have power applied for software to run. For example, if the relevant wiring on the EEPROM is to set a pin high, this pin can simply be connected to the power supply pin on the IC.

Another alternative approach makes used of on-board fuses included on some ICs. Such on-board fuses can be blown, by applying an overvoltage to the relevant pin for example, in order to create a non-reversible boot configuration. In some cases this would not achieve the objective because software may be able to blow further fuses and accordingly change the boot configuration. However, some ICs only allow the fuses to be blown by application of an external voltage (which cannot be changed by software), in which case blowing an appropriate fuse configuration will achieve the objective.

The logic block (101) will typically be connected to a number of additional components. One of these might be a network interface (105) which allows software executing on the logic block (101) to communicate with other computer systems connected to the user network (400). Other components (110) might include RAM and persistent storage, as well as further network interfaces.

The storage controller (150) contains an interface manager (151) which is responsible for managing communications with the logic block (101) over the common interface (102). The interface manager (151) further communicates over interface 155 with the storage manager functional unit (152). The storage manager may be software executing on a dedicated processor within the storage controller.

The interface manager (151) is responsible for identifying requests from the logic block (101) to read or write data from or to some defined storage identifier. Such an identifier might be a memory address, or a block address, depending on the protocol used on the interface 102. The interface manager will identify valid read requests from the logic block and communicate these to the storage manager (152), which may return data in response. If the storage manager returns data in response, the interface manager will return this data to the logic block.

The interface manager (151) may also identify write requests from the logic block (101). Optionally these will not be communicated to the storage manager (152), although the interface manager may be configured to respond to the logic block as if the write request has been successfully executed, even though it has not. In this way, the logic block can read data from the storage manager but cannot write to it.

Interface 155 may, at all times, be unidirectional, with a completely separate interface 156 provided for the purpose of changing the boot image provided to the logic block 101. The boot image can legitimately be changed via interface 156, but cannot be changed over interface 155. The boot image could only be changed over interface 155 if there was an implementation flaw in interface manager 151. Interface manager 151 is vastly simpler than (for example) an operating system running on the host computer, and thus the likelihood of a flaw existing in interface manager 151 is incomparably smaller than the likelihood of an exploitable flaw in an operating system, making the present scheme very much more secure. In addition this scheme allows the boot image to be updated without any physical intervention.

The storage manager (152) is connected via the network interface (153) to the management network (300), and via this network can communicate with the management computer system (200). Using this communications channel, the management computer system may instruct the storage manager what data to return in response to a read request received from the interface manager (151). This instruction may take place at the time that the read request from the interface manager is received, and the storage manager may, on receipt of such a read request, make a request to the management computer system to determine what data to return. Alternatively, the instruction may take place in advance of the read request from the interface manager, and the management computer system may instruct the storage manager in advance what data it should return in response to a read request from interface manager 151, with the storage manager storing the instruction data on a memory.

Because both interface 102 and interface 155 are typically simple low-level interfaces, the interface manager (151) can be implemented using a "high assurance" approach, such as implementation in hard-wired logic, via ASIC or PLD, or using formally verifiable software instructions. This is desirable in order to minimise the risk that malicious software executing on the logic block (101) might compromise the behaviour of the interface manager (151). It should be appreciated, however, that the storage controller does not necessarily need to be implemented using a high assurance approach. What is required, in order to achieve the security objectives, is that at some time after boot, in the event that malicious software manages to gain control over the logic block (101), this malicious software will find it difficult to cause the controller (150) to behave in a way different from the intentions of its designers. Since the functionality of the controller is relatively straightforward, primarily receiving boot instructions from the management computer and refusing writes from the logic block, implementations may be inherently difficult to compromise in practice without being specifically designed to be so by a formal method.

As an extreme example, implementation of the storage manager (152) might (erroneously or maliciously) include code that allows malicious software to gain control over the storage manager and, in theory, modify its behaviour such that at a subsequent boot, it returns data different from that which management computer system (200) instructs it to. However, this sort of case is sufficiently unlikely that in practice it causes minimal security concerns. What is of more practical concern is that a poor implementation of the interface manager (151) could allow an unexpected input across interface 102 to cause the interface manager to start executing malicious code. The reason this is a more realistic concern is that while the protocol between the interface manager (151) and the storage manager (152) is likely to be exceptionally simple (e.g. a mere request for a particular block of storage) the protocol that runs over interface 102 could be relatively more complex (as for example in the case of PXE Boot described below) and hence the chances of finding an unexpected input that causes the implementation of the interface manage (151) to behave in an unexpected manner are relatively high.

The risk of compromise across interface 102 can be reduced by developing the interface manager (151) in a "high assurance" manner. Ways in which this could be achieved would include:

- using a logic design implemented in ASIC or PLD rather than a Turing machine. Note that coincidentally this might involve the interface manager being preconfigured by being logically hard-wired, but equally a PLD could in principle be reprogrammable from the storage manager (152) provided it is not reprogrammable from the logic block (101);
- software running on a Turing machine, provided that this software was developed using formal methods and thus known not to incorporate any scope for unexpected behaviour. This would not need to be logically hard-wired; the software could be loaded from read-writable storage provided that this storage was not accessible from the logic block (101).

In practice, these approaches would be impractical for PXE boot or similar arrangements, but are realistic for simpler protocols.

It is helpful, in order to understand the advantages of embodiments of the invention, to perform a comparison with known network boot techniques, such as PXE boot for x86 technology based on the Intel 8086 CPU.

In a network boot scenario, a computer system is equipped with one or more "boot ROMe" which are used to bootstrap the computer and instruct it to retrieve a boot image from a network server. In the case of pre-boot execution environment (PXE) boot for x86 systems:

- The first boot stage is from a BIOS or Unified Extensible Firmware Interface (UEFI) ROM.
- This stage identifies a PXE ROM.
- The PXE ROM contains instructions to obtain an IP address using DHCP.
- The PXE ROM then contains instructions to retrieve a file from a network server using TFTP.
- Control is then passed to instructions in the image file retrieved.
- The network server can be configured to disallow TFTP puts/writes, and the image file can be changed on the network server as required. This allows updates to the image file but not to the PXE ROM.

It is notable that in practice the BIOS/UEFI and PXE ROMs are never true ROMs, but in fact are programmable ROMs, which as described above are a form of persistent storage. This is necessary because there is considerable complexity involved in such network boot processes, with a high likelihood that upgrades and patches will be required at some point.

Embodiments of the present invention differ from such known network boot schemes in a number of respects.

Support for the protocol between the logical boundary of CPU (101) and the storage controller (150) is provided within the computer system (100) in true hard wired form, either via instructions provided in genuine (non-rewritable) ROM, or via hard-wired logic on the silicon. Logic block 101 is truly "read only" whereas in PXE Boot the logic block contains re-flashable PROM. As a result, the protocol will likely be a simple pre-configured interface protocol such as that used to retrieve bytes from a flash memory chip, or from a hard disk. Other examples may include a protocol to retrieve data from RAM, or from an SD card. Use of a hard wired arrangement, implementing such fundamental communication protocols, makes it difficult to tamper with the boot process without having physical access to the internals of the computer system. The use of a simpler protocol across interface 102 makes it practically feasible to use "high assurance" engineering approaches to develop the interface manager (151).

By using a preconfigured communication protocol that is integral to the design of the CPU, or logic block containing multiple CPUs, the storage controller (150) can be located in the system in such a way that it responds to the very first request which the CPU (101) makes to retrieve data from a separate component, outside of its physical and/or logical boundary, in order to boot the system. Thus, in the case of an x86 boot process, the storage controller (150) would emulate the BIOS/UEFI ROM, supplying to the CPU (101) the reset vector and the instructions at that address.

Given the above two points, there is no way in which malicious software can store instructions which are executed prior to the request to the storage controller (150). The protocol between the CPU (101) and the storage controller (150) is preconfigured within the architecture of the CPU (101). Because the protocol is so simple, and fundamental to the operation of the CPU, it cannot be altered by software means and the storage controller (150) can, optionally, manage its end of this protocol using hard-wired logic or a formally verifiable series of microcontroller instructions, meaning that malicious software operating on the computer system (100) will also never be able to use this protocol as a means of compromising logic in the storage controller (150). This compares with the complexity of an IP/Ethernet network, which is typically comprised of numerous components such as switches, DHCP servers, etc, combined with a software-based TFTP server. Such a complex system is not amenable to being implemented using hard-wired logic or formally verifiable instructions, and hence is likely to contain vulnerabilities which could be exploited by malicious software operating on a computer system.

Another useful comparison would be with systems that allow "bricked" systems to be recovered. Some systems (PCBs containing at a minimum a CPU and a boot PROM) allow for the attachment of a cable which would allow a second system to reprogram the boot PROM. The reason this is provided is to allow recovery in the event that the system is "bricked", i.e. software running on the CPU reprograms the PROM incorrectly and it is no longer possible to achieve even a minimal boot of the CPU. Such cables are not made available to general users. In such arrangements, it is possible for software running on the CPU to re-flash the PROM. This is not possible according to embodiments of the invention.

It should be noted that many processors have a two-stage boot process, whereby they first seek instructions from a first source, such as an EEPROM. The instructions from the first source instruct the processor to seek further instructions from a second source, such as an SD card. Any embodiment of the invention may be implemented in such a system, with the first stage of the boot process being replaced by the above described controller component and logic block preconfigured to communicate with the controller over the first interface according to the first communication protocol in a manner that cannot be altered by instructions executed by the computer system.

Specific examples will now be provided of the various components that may be used to implement an embodiment of the invention. It should be appreciated that different, equivalent, components may be used whilst still implementing the same functional steps described.

Logic block 101 may be the Freescale™ i.MX6 processor which is configured to seek its initial boot instructions over interface 102 using the 4-wire SPI protocol. Interface manager 151 may be implemented using an FPGA and storage manager 152 may be implemented using a Texas Instruments™ Open Multimedia Applications Platform (OMAP) processor and an associated dual-port memory. The FPGA may be configured to act as a serial peripheral interface (SPI) slave, communicating over interface 102 with the i.MX6 processor which acts as SPI master. The FPGA may also be configured to read from the dual-port memory of the storage manager using interface 155.

Following SPI start-up, the FPGA reads bits from the SPI Master Output, Slave Input (MOSI) line and identifies any instructions issued by the i.MX6 processor, such as ERASE, ERAL, EWDS, EWEN, READ, WRITE and WRAL. For all instructions except for READ, the FPGA replies to the i.MX6 as specified by the protocol, but takes no further action.

In the case that a READ instruction is received over the SPI MOSI (Master Output, Slave Input) line, the FPGA may parse the addressed memory location sent as part of the READ instruction. The FPGA then carries out a read from the appropriate address in the memory using interface 155. The FPGA outputs the 8 bits read to the i.MX6 over the SPI MISO (Master Input, Slave Output) line. In the event that the SPI slave select (SS) line is held high by the i.MX6, the FPGA subsequently returns the next 8 bits from the memory over the SPI MISO line. This may continue until the SPI SS line is no longer held high. READ instructions can be carried out in this way until the i.MX6 is booted.

If changes to the boot data are required, the TI OMAP processor can retrieve the data using network interface 153 and write it to the memory using the second port.

As has been described above, simple protocols are desirable because they are economically and technically feasible to implement in hardware, making the system difficult if not impossible to compromise. Nevertheless, a range of protocols may be feasible, some of which are more complex than others, and more complex protocols may have increased functionality or otherwise be advantageous. In practical implementations, the 'best' protocol may therefore be regarded as the most complex protocol that is economically and technically feasible to implement. This will vary according to the application.

By way of another example, logic block 101 is configured to seek its initial boot instructions over interface 102 using the SD Card protocol or the embedded MultiMediaCard (eMMC) protocol.

The SD Card protocol and the eMMC protocol allow for a greater delay between a read request being issued by the logic block 101 and the data being provided by the interface manager 151, compared to the SPI protocol and other simple memory access interfaces. Simple memory access interfaces must reply with the requested data within a predefined number of clock cycles, whereas the SD Card protocol and eMMC protocol allow for a greater delay before the interface manager 151 must reply with the data.

The greater latitude in timing allowed by the SD Card protocol and the eMMC protocol may provide a wider choice of implementations than simple memory access interfaces such as SPI. For example, whereas simple memory access interfaces may require storage to be implemented as SRAM, the SD Card protocol or eMMC protocol may allow the use of DRAM in storage manager 152. The use of DRAM allows storage manager 152 to contain a much larger store of data than possible with SRAM, and may allow storage controller 150 to serve a complete Operating System image rather than merely a BIOS or bootloader. Further, in implementations in which a single storage controller serves multiple logic blocks, as described below with reference to FIGS. 6 and 7, the use of the SD card protocol or eMMC protocol allows multiple logic blocks to be booted in parallel, rather than sequentially. If a simple memory-access protocol with strict timing requirements is used, each read request needs to be processed immediately. This means that any parallelism is limited by the peak transfer rate of the SRAM. The greater delay latitude provided by the more complex protocols allows read requests to be queued, and requests to the DRAM spread out to achieve a greater overall throughput even though the peak transfer rate may be the same.

Figure 3:
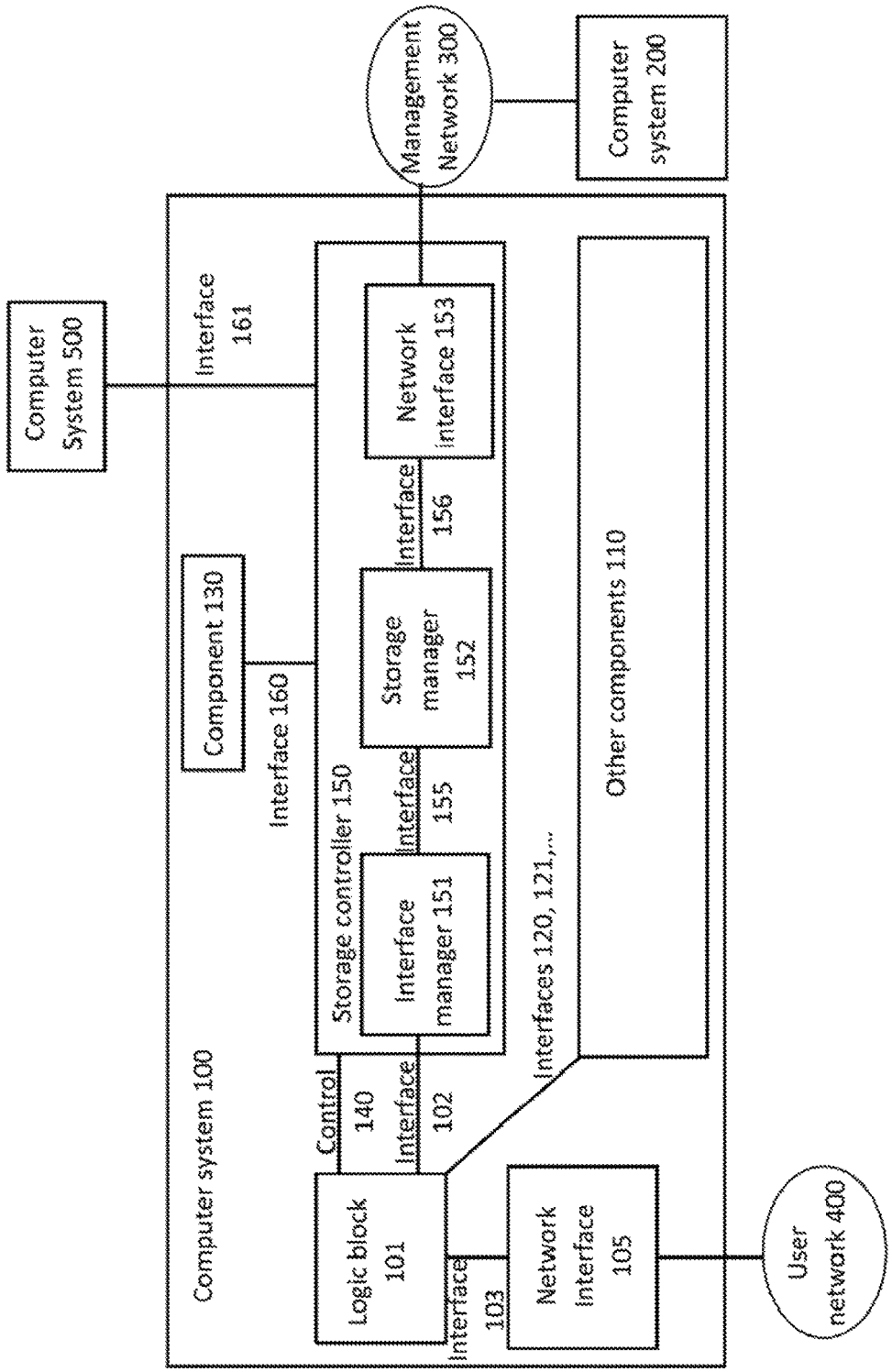
FIG. 3 is a further schematic diagram of a first and second computer system which also includes a control feature.

FIG. 3 shows first and second computer systems corresponding to the first and second computer systems described above with reference to FIG. 2, but which further include a control feature.

As can be seen, the secure boot system (100) of FIG. 3 includes the same components, connections and interfaces as the secure boot system (100) of FIG. 2, but further includes a control connection (140) which connects the logic block (101) to the storage controller (150). The storage controller (150) may use the control connection (140) to power-up the logic block (101), power-down the logic block, or to reset the logic block. In particular, this allows the logic block to be powered up from an inactive state, or reset, to force it into a known good state by executing the boot instructions.

The term "reset" as used herein includes both a power-cycle of the logic block (a sequence of powering down the logic block (101) followed by powering up the logic block), and what may be referred to as a "hardware reset". A hardware reset is a hardware-level method of forcing a logic block to execute its initial boot process without going through a power-down/power-up sequence.

The term "power-up" as used herein refers to powering up the logic block from an inactive, powered down state, where the logic block has been in the inactive state for a relatively long time. It will be appreciated that any time the logic-block is powered-up, the power-up will have been preceded, at some point, by a power-down. However, the term "power-up" used herein is used in contrast to a power-cycle reset, where the power-up occurs a relatively short time after the preceding power-down.

The control connection (140) may connect the storage controller (150) to the voltage input pins of one or more integrated circuits which implement the logic block (101). In this way, the storage controller (150) can control whether or not voltage is applied to the one or more integrated circuits implementing the logic block (101), and therefore control the power state of the logic block (101).

Alternatively or additionally, the control connection (140) can connect the storage controller (150) to a hardware reset pin of an integrated circuit implementing the logic block (101). Pulling the voltage low on the hardware reset pin and returning the voltage to high will cause the logic block (101) to execute its initial boot process.

The storage controller (150) may include a Power Management integrated Circuit (PMIC), not shown in FIG. 3. Where the storage controller includes a PMIC, the control connection (140) can connect the PMIC to the voltage input pins and/or the hardware reset pin of the one or more integrated circuits that implement the logic block.

As described previously, the logic block (101) is preconfigured to seek boot instructions from the storage controller (150) immediately after power-up or reset. By combining this functionality with the control functionality, the storage controller (150) is advantageously able to place the logic block (101) in a desired active end state in such a way that no software operating on the logic block prior to commencement of the process can affect the end state. If the logic block (101) is in an unknown active state—which might be running malicious software—the storage controller (150) can power down and then power up, or reset, the logic block. Following this, the logic block (101) will, post-boot, be in a desired active state such that the storage controller (150) can be certain that it is not running malicious software.

The controller may also control the power state of RAM connected to the logic block (101), such as RAM 115 shown in FIG. 1. If the logic block (101) is powered down or reset having been running malicious software, but the RAM is not powered down or reset, there is a risk that some data may be left in the RAM and that this will affect the end state of the logic block (101) following reset or a subsequent power-up of the logic block (101). Such data could cause a recurring compromise post reboot. Powering down the RAM helps ensures that there can be no residual effect from software running on the device prior to reboot. In some implementations, the RAM may be powered down for sufficiently long to avoid issues with data remanence.

The storage controller (150) may include a further logic component for determining whether it should use the control connection (140) to power-up, power-down or reset the logic block (101). For example, the storage controller (150) may include a lifecycle manager (154), shown in FIG. 4.

There are a number of ways in which the storage controller (150) may determine that it should use the control connection (140) to power-up, power-down or reset the logic block (101).

One way in which the storage controller (150) may determine that it should power-up, power-down or reset the logic block (101) involves the storage controller receiving a communication from the logic block over interface 102. Based on the communication, the storage controller may determine that the logic block (101) should be powered down or reset.

In one example of this, the storage controller (150) receives a communication from the logic block (101) which indicates that the logic block has finished processing data. The storage controller may then determine that the logic block (101) can be powered down, and use the control connection (140) to power-down the logic block (101). In another example, the storage controller (150) receives read or write requests from the logic block (101), and the storage controller determines that the logic block (101) needs to be powered down or reset based on the read or write requests. For example, certain read or write requests may imply that malicious software has taken control of the logic block, in which case it may be necessary to power down or reset the logic block (101). In some cases, software running on the logic block (101) may not be expected to make any write requests to the storage controller (150). In this case any write request may be taken to be evidence that malicious software is running on the logic block (101).

Another way in which the storage controller may determine that it should power-up, power-down or reset the logic block involves the storage controller (150) receiving an input from the management network (300). This may be an input from the management computer system (200), or may be an input from another system that is connected to the management network (300) but not shown in FIG. 3 or 4. In one example, the management network (300) issues a request to power-up, power-down or reset the logic block (101), and the storage controller (150) responds by powering up, powering down or resetting the logic block (101) using the control connection (140). In some cases, the logic block (101) may initially be being used by a first user, and the management computer system (200) (or a user thereof) may decide that access to the logic block (101) should be allocated to a second user, who may be a higher-priority user than the first user. In this case, the storage manager (150) would request that the logic block (101) is power-cycled to a known, good state, after which it could be allocated to the higher-priority user.

A third way in which the storage controller (150) may determine that it should power-up, power-down or reset the logic block (101) involves the storage controller (150) receiving an input over some other previously unspecified interface, such as interface 160 or interface 161. Interface 160 connects a previously unspecified component (130) of the secure boot system (100) to the storage controller (150), and interface 161 connects some previously unspecified computer system (500) to the storage controller (150).

For example, component 130 and/or computer system 500 may generate an input for the storage controller (150) based on a sensor input, user input or an input from some further network connection. Based on the input received over interface 160 and/or interface 161, the storage controller (150) may determine that it should power-up, power-down or reset the logic block (101). In some cases, the logic block (101) may be being used as a 'slave' to a separate processing block not shown in FIG. 3 or 4. In this case, sensor or user input may indicate that the separate processing block no longer needs the slave processing block (101), such that the logic block (101) can be powered down or reset.

It will be understood that the storage controller (150) may be configured to determine that it should power-up, power-down or reset the logic block (101) in any one or more of the ways described above, as well as other ways not described above. It will also be understood that component 130, computer system 500 and interfaces 160 and 161 are not essential to implement the control functionality.

Figure 4:
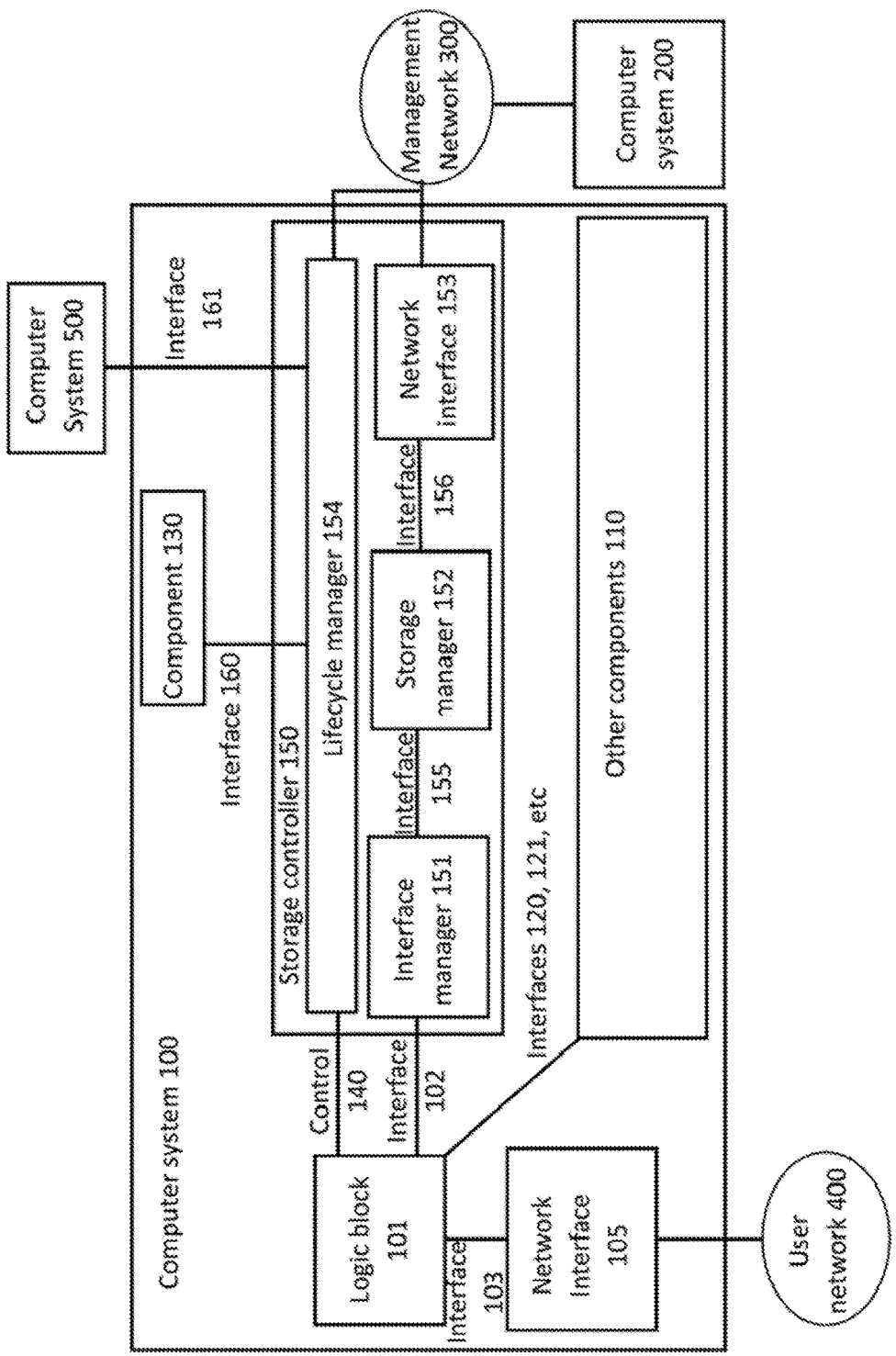
FIG. 4 is a further schematic diagram of a first and second computer system which also includes a control feature.
Figure 5:
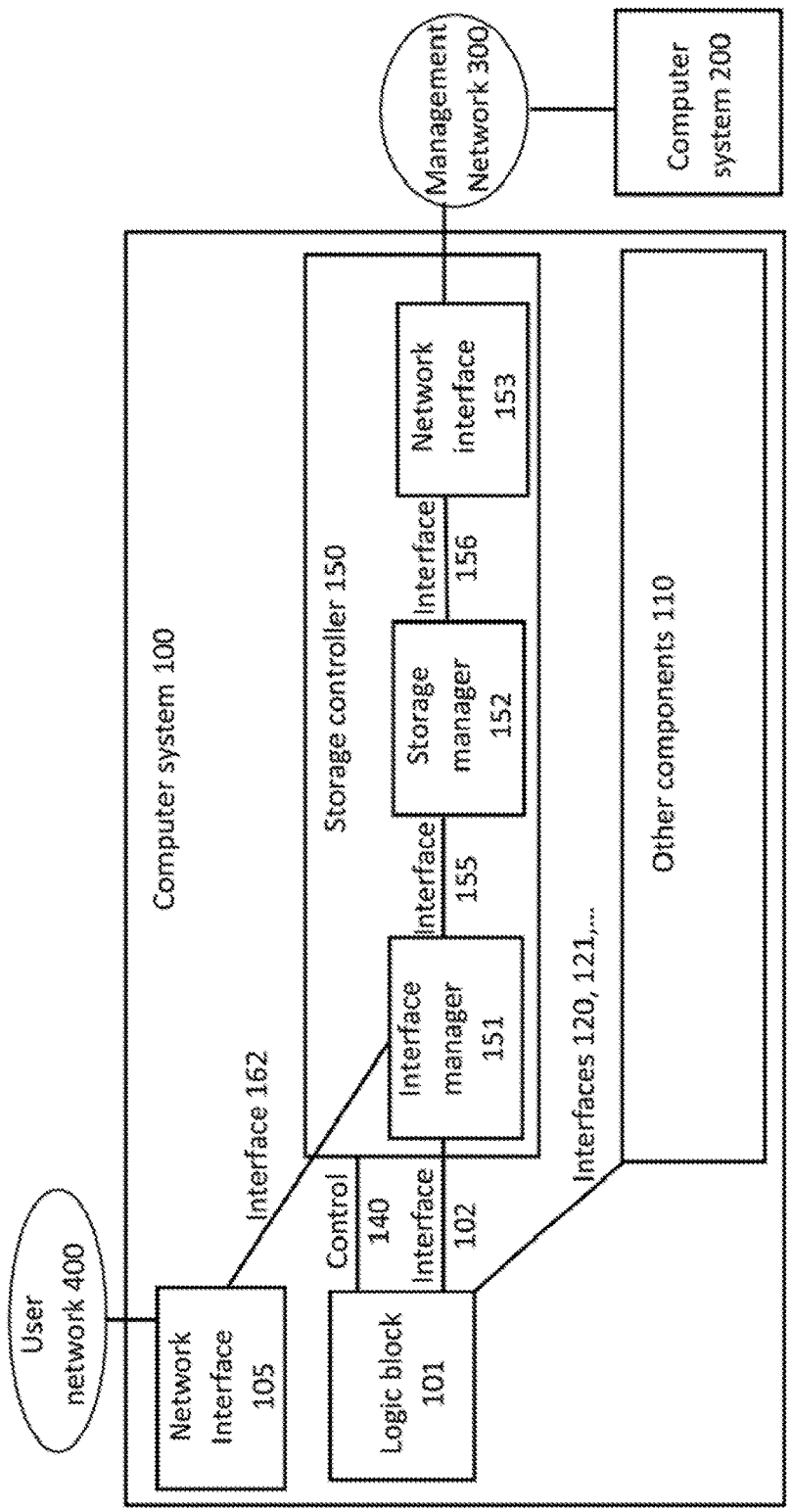
FIG. 5 is a further schematic diagram of a first and second computer system which includes an integrated network interface.

FIG. 5 shows first and second computer systems which are substantially the same as those described above with reference to FIGS. 2 to 4, but in which network interface 105, if present, is implemented in an alternative manner.

In the embodiment shown in FIG. 5, network interface 105 is not connected to the logic block (101), as it is in FIGS. 2 to 4. Instead, network interface 105 is connected to the interface manager (151) of the storage controller (150) via a previously unspecified interface 162.

According to this arrangement, the logic block (101) communicates with the user network 400 via network interface 105 by communicating with the storage controller (150) over interface 102. Interface 102 is therefore an integrated interface, used for both requesting boot instructions from the storage controller (150) and communicating with the user network (400). Implementing interface 102 as an integrated interface may be advantageous where the number of available pins of one or more integrated circuits implementing the logic block (101) is limited.

In order to implement interface 102 as an integrated interface, the interface manager (151) identifies communications which it receives over interface 102 and responds appropriately. If the interface manager (151) identifies the communication as a request to read or write stored data, such as the boot image, the interface manager (151) either forwards the request to the storage manager (if a read request) or discards the request (if a write request), as described above with reference to FIG. 2. If the interface manager (151) identifies the communication as a request to read or write network data, the interface manager (151) forwards the request to network interface 105 over interface 162.

One exemplary implementation of the embodiment of FIG. 5 makes use of the SDIO protocol, which allows a device to provide both storage services and input/output (I/O) services over the same physical interface. The interface manager (151) would therefore be responsible for ensuring that requests to read stored data are handled by the storage manager (152), that requests to write data are discarded, and that network read and write requests are handled by the network interface (105).

It will be understood that while FIG. 5 shows the control connection (140) described above with reference to FIGS. 3 and 4, the alternative network interface of FIG. 5 can be implemented with or without the control connection.

Figure 6:
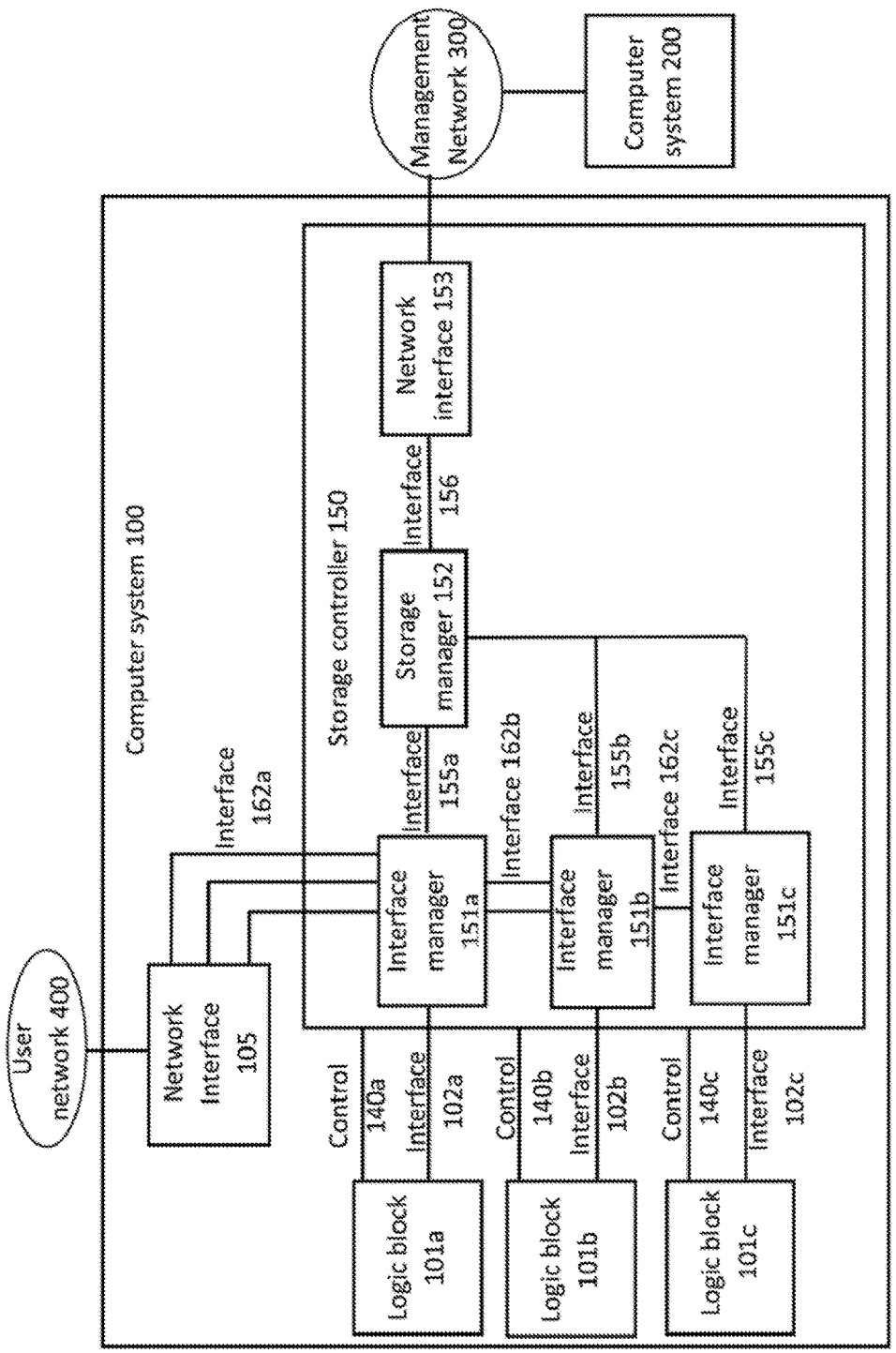
FIG. 6 is a schematic diagram of a first and second computer system which includes multiple logic blocks.
Figure 7:
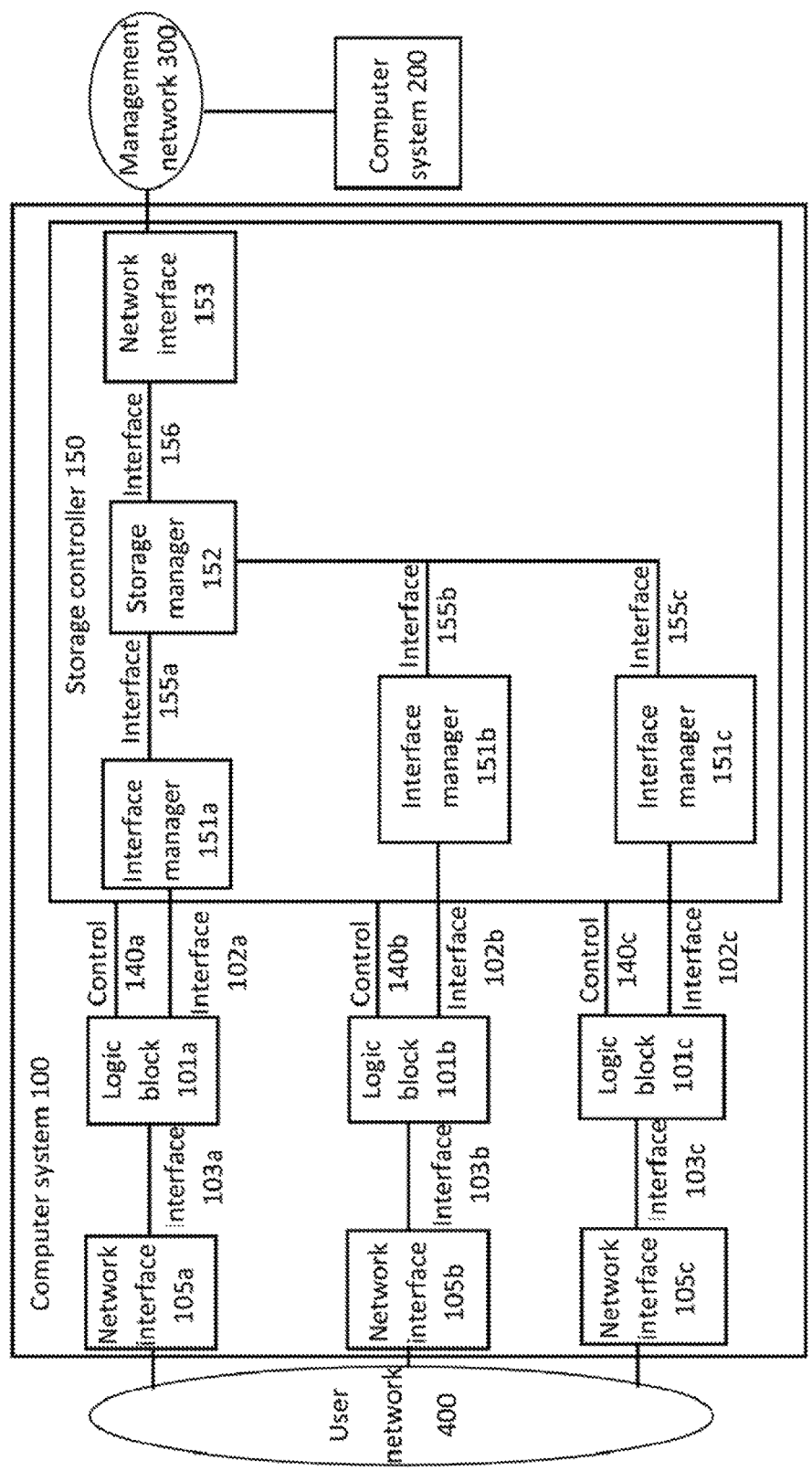
FIG. 7 is a further schematic diagram of a first and second computer system which includes multiple logic blocks.

FIGS. 6 and 7 show a secure boot system (100) and a management computer system (200), wherein the secure boot system (100) includes multiple logic blocks (101a, 101b, 101c).

As can be seen from FIGS. 6 and 7, the secure computer system (100) includes multiple logic blocks (101a, 101b, 101c) and a storage controller (150). Each of the logic blocks (101a, 101b, 101c) is connected to the storage controller (150) over an interface (102a, 102b, 102c), and the storage controller (150) is connected to a management network (300), allowing the storage controller (150) to communicate with the management computer system (200). Each of the logic blocks (101a, 101b, 101c) is configured to request boot instructions from the storage controller (150) upon power-up or reset, as described above with reference to FIGS. 1 to 5.

Each individual component, connection and interface shown in FIGS. 6 and 7 may be the same, and may behave in the same way, as the corresponding components, connections and interfaces described above with reference to FIGS. 1 to 5. However, in the embodiments of FIGS. 6 and 7, a single storage controller (150) controls multiple logic blocks (101a. 101b. 101c). In particular, multiple logic blocks (101a, 101b, 101c) seek boot instructions upon power-up or reset from the same storage controller (150), and from the same storage manager (152).

Each of the logic blocks (101a, 101b, 101c) can be the same as the logic block (101) described above with reference to any of FIGS. 1 to 5. While FIGS. 6 and 7 show three logic blocks (101a, 101b, 101c), it will be understood that this is merely for the purposes of illustration, and that any number of logic blocks greater than one is consistent with the embodiments of FIGS. 6 and 7.

The storage controller (150) includes one or more interface managers (151a, 151b, 151c), a storage manager (152), and a network interface (153) connected to the management network (300), allowing the storage controller (150) to communicate with the management computer system (200). FIGS. 6 and 7 show a single storage manager controlling a plurality of logic blocks (101a, 101b, 101c). However, the secure boot system (100) could include multiple storage controllers (150), each of which controls a different plurality of logic blocks.

Each of the one or more interface managers (151a, 151b, 151c) can be the same as the interface manager (151) described above with reference to any of FIGS. 1 to 5. Each of the one or more interface managers (151a, 151b, 151c) is connected to the storage manager (152) over an interface (155a, 155b, 155c), and each of the one or more interface managers (151a, 151b, 151c) is also connected to one of the logic blocks (101a, 101b, 101c) over an interface (102a, 102b, 102c). While FIGS. 6 and 7 show a corresponding number of logic blocks (101a, 101b, 101c) and interface managers (151a, 151b, 151c), this is not a requirement. For example, there could be a single interface manager (151) connected to multiple logic blocks (101a, 101b, 101c) using multiple interfaces (102a, 102b, 102c).

The storage manager (152) can be the same as the storage manager (152) described above with reference to any of FIGS. 1 to 5. The storage manager (152) is connected to the one or more interface managers (151a, 151b, 151c) over the one or more interfaces 155a, 155b, 155c, as described above, and is also connected to network interface 153 over interface 156. The one or more interfaces (155a, 155b, 155c) connecting the one or more interface managers (151a, 151b, 151c) to the storage manager (152) can be the same as the interface (155) described above with reference to FIGS. 1 to 5. Likewise, the interface (156) connecting the storage manager (152) to network interface 153 can be the same as the interface 156 described above with reference to FIGS. 1 to 5.

Network interface 153 can be the same as the network interface 153 described above with reference to any of FIGS. 1 to 5. As well as being connected to the storage manager (152) over interface 156, network interface 153 is connected to a management computer system (200) via a management network (300). The management computer system (200) and the management network (300) can serve the same purpose and behave in the same way as described with reference to any of FIGS. 1 to 5.

The secure computer system (100) of FIG. 6 can also include network interface 105, which may be the same as the network interface 105 described with reference to FIG. 2 or may be the same as the network interface described above with reference to FIG. 5. Therefore, while FIG. 6 shows the network interface 105 connected to the one or more interface managers (151a, 151b, 151c) by interfaces 162a, 162b, 162c, it will be understood that the network interface 105 can also be connected to each of the logic blocks (101a, 101b, 101c) by an interface (103), as described with reference to FIG. 2. Alternatively, and as shown in FIG. 7, there may be more than one network interface (105a, 105b, 105c). Each of the one or more network interfaces (105a, 105b, 105c) may be connected to one or more logic block (101a, 101b, 101c), as shown in FIG. 7 and analogous to FIG. 2, or may be connected to one or more of the interface managers (151a, 151b, 151c), analogous to FIGS. 5 and 6.

Each of the interfaces (102a, 102b, 102c) connecting the logic blocks (101a, 101b, 101c) to the one or more interface managers (151a, 151b, 151c) may be the same as the interface (102) described above with respect to FIGS. 1 to 5. FIGS. 6 and 7 show each of interfaces 102a, 102b, 102c as the integrated interface described above with reference to FIG. 5, but it will be understood that each of interfaces 102a, 102b, 102c could also be the interface 102 described above with reference to FIGS. 2 and 3. FIGS. 6 and 7 also show each logic block (101a, 101b, 101c) connected to the storage controller by a control connection (140a, 140b, 140c), such that the embodiments of FIGS. 6 and 7 can implement the control functionality described above with reference to FIGS. 3 and 4. In this case, the control functionality can be implemented as described with reference to FIGS. 3 and 4, and the secure boot system (100) can include any of the additional components, connections and interfaces described with reference to FIGS. 3 and 4 but not shown in FIGS. 6 and 7. It will also be understood that the embodiments of FIGS. 6 and 7 can be implemented without the control functionality, in which case the control connections (140a, 140b, 140c) are not necessary.

Where the embodiments of FIGS. 6 and 7 include the control functionality, the storage controller is able to independently power-up, power-down or reset each of the multiple logic blocks (101a, 101b, 101c). Therefore, a single storage controller (150) with a single storage manager (152) is advantageously able to provide multiple logic blocks with the same set of boot instructions from a single storage manager (152) yet independently control the power state of the multiple logic blocks.

The embodiments of FIGS. 6 and 7 may also include any other components described with reference to FIGS. 1 to 5 but not shown in FIGS. 6 and 7. For example, the secure boot system (100) may include the other components (110) described with reference to FIGS. 1 and 2, the component 130 and interface 160 described with reference to FIGS. 3 and 4, and may be connected to computer system 500 over interface 161 as described with reference to FIGS. 3 and 4.

Described above are a number of embodiments with various optional features. It should be appreciated that, with the exception of any mutually exclusive features, any combination of one or more of the optional features are possible.

The invention claimed is:

1. A secure boot computer system comprising:
a logic block comprising one or more processing units that execute instructions, the logic block requesting boot instructions over a first interface, according to a first communication protocol, on power-up or reset of the logic block; and
a controller to communicate with the logic block over the first interface according to the first communication protocol, the controller implementing a communications link to a second computer system and receiving the boot instructions from the second computer system;
wherein the logic block is logically hardwired to communicate with the controller over the first interface according to the first communication protocol; and
wherein the controller prevents a completion of any requests from the logic block to write boot instructions;
the system further comprising a control connection between the logic block and the controller;
the controller using the control connection to power-up or reset the logic block to place the logic block in a predetermined active state resulting from executing the boot instructions, such that software operating on the logic block prior to power-up or reset of the logic block cannot affect the predetermined active state.

2. The secure boot computer system according to claim 1 wherein the controller comprises an interface manager and a storage manager;
wherein the interface manager is configured to communicate with the logic block over the first interface according to the first protocol and is further configured to communicate with the storage manager over a second interface;
wherein the interface manager is further configured to identify requests for data from the logic block over the first interface and communicate the requests to the storage manager over the second interface; and
wherein the second interface is a unidirectional interface, such that it is not possible for data to flow from the logic block to the storage manager except for the purpose of specifying data that should be read from the storage manager via the interface manager.

3. The secure boot computer system according to claim 1 wherein the logic block is logically hardwired using: one or more application specific integrated circuits and/or one or more programmable logic devices.

4. The secure boot computer system according to claim 1 wherein the controller is preconfigured, at a point prior to the logic block executing instructions to boot the computer system, to prevent any requests from the logic block to write boot instructions.

5. The secure boot computer system according to claim 1 wherein: the controller includes a physical communications port which is connectable via a cable to the second computer system such that data passing over the communications link is inaccessible by any other component of the secure boot computer system.

6. The secure boot computer system according to claim 1 wherein the controller includes a store for storing the boot instructions, whereby the boot instructions may be received from the second computer system and stored prior to power-up or reset of the secure boot computer system.

7. The secure boot computer system according to claim 1 wherein the controller is configured, in response to a request for the boot instructions from the logic block, to request the boot instructions from the second computer system at the time of receiving the request from the logic block.

8. The secure boot computer system according to claim 1 wherein the boot instructions comprise a reset vector.

9. The secure boot computer system according to claim 8 wherein the controller also provides the instructions located at the address identified by the reset vector.

10. The secure boot system according to claim 1 wherein resetting the logic block comprises one or more of powering-down, and then powering-up the logic block, and performing a hardware reset.

11. The secure boot system according to claim 1 wherein the controller is further configured to use the control connection to control the power state of RAM connected to the logic block.

12. The secure boot system according to claim 1 wherein the control connection connects to one or more voltage input pins of the logic block, and wherein powering-up or resetting the logic block comprises controlling whether voltage is applied to one or more of the voltage pins.

13. The secure boot system according to claim 1 wherein the control connection connects to a reset pin of the logic block, and wherein the controller can reset the logic block by controlling whether voltage is applied to the reset pin.

14. The secure boot system according to claim 1 wherein the controller comprises a power management integrated circuit, PMIC, and wherein the control connection is between the PMIC and the logic block.

15. The secure boot system according to claim 1 wherein the controller is configured, in response to a communication from the logic block over the first interface which indicates that the logic block has finished processing data, to use the control connection to power-down or reset the logic block.

16. The secure boot system according to claim 15 wherein the communication from the logic block over the first interface comprises one or more read or write requests.

17. The secure boot system according to claim 16 wherein the controller is configured to power-down or reset the logic block in response to any request from the logic block to write boot instructions.

18. The secure boot system according to claim 1 wherein the controller is configured, in response to a communication from the logic block over the first interface which indicates that malicious software has taken control of the logic block, to use the control connection to power-down or reset the logic block.

19. The secure boot system according to claim 18 wherein the controller is configured to analyse the communication sent by the logic block over the first interface to determine whether malicious software has taken control of the logic block.

20. The secure boot system according to claim 18 wherein the communication from the logic block over the first interface comprises one or more read or write requests.

21. The secure boot system according to claim 1 wherein the controller is configured, in response to a communication over the communications link, to use the control connection to power-up, power-down or reset the logic block.

22. The secure boot system according to claim 21 wherein the communication over the communications link is: from the second computer system.

23. The secure boot system according to claim 21 wherein the communication over the communications link is a request to power-up, power-down or reset the logic block.

24. The secure boot system according to claim 1 wherein the controller is configured, in response to input from a sensor, to power-up, power-down or reset the logic block.

25. The secure boot system according to claim 1 wherein the controller is configured, in response to input from a user, to power-up, power-down or reset the logic block.

26. The secure boot system according to claim 1 further configured to allow the logic block to communicate with a user network over a network interface.

27. The secure boot system according to claim 26 wherein the logic block is configured to communicate with the network interface: over an interface that is distinct from the first interface.

28. The secure boot system according to claim 26 wherein the logic block is configured to communicate with the network interface via the controller and over the first interface, and wherein the controller is configured, in response to a request from the logic block to read or write network data over the first interface, to forward the request to read or write network data to the network interface.

29. The secure boot system according to claim 1 further comprising one or more additional logic blocks comprising one or more processing units, each of the one or more additional logic blocks being configured to request boot instructions over a respective first interface according to the first communication protocol, on power-up or reset of the respective logic block;
   wherein the controller is further configured to communicate with the one or more additional logic blocks over the respective first interfaces according to the first communication protocol;
   wherein each of the one or more additional logic blocks is logically hardwired to communicate with the controller over the respective first interfaces according to the first communications protocol;
   wherein the controller is further configured to prevent the completion of any requests from the one or more additional logic blocks to write boot instructions;
   wherein the system further comprises respective control connections between the controller and each of the one or more additional logic blocks;
   the controller being configured to use the control connections to power-up or reset the logic blocks to place the logic blocks in a predetermined active state resulting from executing the boot instructions, such that software operating on the logic blocks prior to power-up or reset of the logic blocks cannot affect the predetermined active state.

30. The secure boot system according to claim 29 wherein the controller comprises a respective interface manager for each logic block and a common storage manager, and wherein each respective interface manager is configured to communicate with its respective logic block over the respective first interface according to the first protocol.

31. The secure boot system according to claim 1 wherein the first communication protocol is any one of the following protocols: the SD Card protocol; the SDIO protocol; or the eMMC protocol.

32. The secure boot system according to claim 1 wherein the boot instructions comprise a complete Operating System.

33. A method of securely booting a computer system that comprises
   a logic block and a controller, the logic block being logically hardwired to communicate with the controller over a first interface according to a first communication protocol, and the controller preventing a completion of any requests from the logic block to write boot instructions, the system further comprising a control connection between the logic block and the controller, the controller using the control connection to power-up or reset the logic block to place the logic block in a predetermined active state resulting from executing the boot instructions, such that software operating on the logic block prior to power-up or reset of the logic block cannot affect the predetermined active state;
the method comprising:
   sending a power command from the controller to the logic block over the control connection instructing power-up or reset of the logic block;
   on power-up or reset of the logic block, requesting via the logic block boot instructions over the first interface, according to the first communication protocol;
   implementing, at the controller, a communications link to a second computer system and receiving the boot instructions from the second computer system;

providing the boot instructions from the controller to the logic block; and subsequently preventing, at the controller, the completion of any requests from the logic block to write boot instructions.

* * * * *